(12) United States Patent
Sato et al.

(10) Patent No.: US 11,436,348 B2
(45) Date of Patent: Sep. 6, 2022

(54) METHOD AND SYSTEM OF PASSING AND APPLYING DELEGATIONS OF AUTHORITY

(71) Applicant: SONY CORPORATION, Tokyo (JP)

(72) Inventors: Naoyuki Sato, Tokyo (JP); Kuniaki Torii, Kanagawa (JP); Fujio Arai, Tokyo (JP); Yusuke Kudo, Kanagawa (JP)

(73) Assignee: Sony Corporation, Tokyo (JP)

( * ) Notice: Subject to any disclaimer, the term of this patent is extended or adjusted under 35 U.S.C. 154(b) by 96 days.

(21) Appl. No.: 16/479,462

(22) PCT Filed: Feb. 21, 2018

(86) PCT No.: PCT/JP2018/006114
§ 371 (c)(1),
(2) Date: Jul. 19, 2019

(87) PCT Pub. No.: WO2018/163812
PCT Pub. Date: Sep. 13, 2018

(65) Prior Publication Data
US 2019/0392157 A1 Dec. 26, 2019

(30) Foreign Application Priority Data
Mar. 7, 2017 (JP) .............................. JP2017-042682

(51) Int. Cl.
*G06F 21/60* (2013.01)
*G06F 21/32* (2013.01)
(Continued)

(52) U.S. Cl.
CPC ............ *G06F 21/604* (2013.01); *G06F 21/32* (2013.01); *G06F 21/33* (2013.01); *G06F 21/62* (2013.01); *H04L 63/107* (2013.01); *G06F 1/163* (2013.01)

(58) Field of Classification Search
CPC ........ G06F 21/604; G06F 21/32; G06F 21/33; G06F 21/62; G06F 1/163; G06F 3/01;
(Continued)

(56) References Cited

U.S. PATENT DOCUMENTS

2012/0200389 A1* 8/2012 Solomon .............. G06Q 10/087
340/5.52
2013/0201000 A1* 8/2013 Solomon ................. G06F 21/32
340/5.83
(Continued)

FOREIGN PATENT DOCUMENTS

CN 104205902 A 12/2014
CN 104521224 A 4/2015
(Continued)

OTHER PUBLICATIONS

Mar. 21, 2014, Facetec, "5 Ways the Smartwatch can Bolster Authentication" https://mobileidworld.com/archive/5-ways-the-smartwatch-can-bolster-authentication/.*
(Continued)

*Primary Examiner* — Theodore C Parsons
(74) *Attorney, Agent, or Firm* — Chip Law Group

(57) ABSTRACT

The present technology relates to an information processing device, an information processing method, and a program that allow authority to be delegated without bothering the user. Provided are an acquisition unit that acquires information for receiving delegation of an authority that is predetermined, a change unit that changes a level of the authority when a predetermined condition is satisfied, and a processing unit that performs a process using the authority that is predetermined. The acquisition unit acquires first information, an inquiry is made to a server using the first information to acquire second information from the server, and the authority that is predetermined is delegated by acquiring the second information. The present technology can be applied
(Continued)

to, for example, an agent device to which the authority to access predetermined information is delegated from a user.

8 Claims, 11 Drawing Sheets

(51) Int. Cl.
  *G06F 21/33* (2013.01)
  *G06F 21/62* (2013.01)
  *H04L 9/40* (2022.01)
  *G06F 1/16* (2006.01)

(58) Field of Classification Search
  CPC ... G06F 21/31; H04L 63/107; H04L 63/0853; H04L 63/0861; H04L 9/32
  See application file for complete search history.

(56) References Cited

U.S. PATENT DOCUMENTS

| | | | |
|---|---|---|---|
| 2013/0268998 A1 | 10/2013 | Ko et al. | |
| 2013/0316686 A1 | 11/2013 | Subbaramoo et al. | |
| 2014/0337634 A1* | 11/2014 | Starner | G06F 21/32 713/186 |
| 2015/0095028 A1* | 4/2015 | Karpey | G10L 17/24 704/246 |
| 2015/0199684 A1* | 7/2015 | Maus | G06Q 20/3829 705/71 |
| 2015/0288688 A1* | 10/2015 | Derakhshani | G06F 21/629 726/19 |
| 2016/0066852 A1* | 3/2016 | Cheng | A61B 5/6831 600/390 |
| 2016/0284207 A1 | 9/2016 | Hou et al. | |
| 2017/0070680 A1* | 3/2017 | Kobayashi | G06K 9/00604 |

FOREIGN PATENT DOCUMENTS

| | | |
|---|---|---|
| CN | 104714414 A | 6/2015 |
| EP | 2648386 A1 | 10/2013 |
| EP | 3073708 A1 | 9/2016 |
| JP | 2004-096591 A | 3/2004 |
| JP | 2009-223651 A | 10/2009 |
| JP | 2013-218698 A | 10/2013 |
| JP | 2015-012496 A | 1/2015 |
| JP | 2015-519024 A | 7/2015 |
| JP | 2017-523737 A | 8/2017 |
| KR | 10-2013-0113970 A | 10/2013 |
| KR | 10-2015-0018824 A | 2/2015 |
| KR | 10-2016-0125284 A | 10/2016 |
| WO | 2016/150160 A1 | 9/2016 |

OTHER PUBLICATIONS

S. Ojala, J. Keinanen and J. Skytta, "Wearable authentication device for transparent login in nomadic applications environment," 2008 2nd International Conference on Signals, Circuits and Systems, 2008, pp. 1-6 (IEEE 2008) (Year: 2008).*

International Search Report and Written Opinion of PCT Application No. PCT/JP2018/006114, dated Apr. 10, 2018, 12 pages of ISRWO.

Office Action for JP Patent Application No. 2019-504445, dated Feb. 8, 2022, 11 pages of English Translation and 07 pages of Office Action.

* cited by examiner

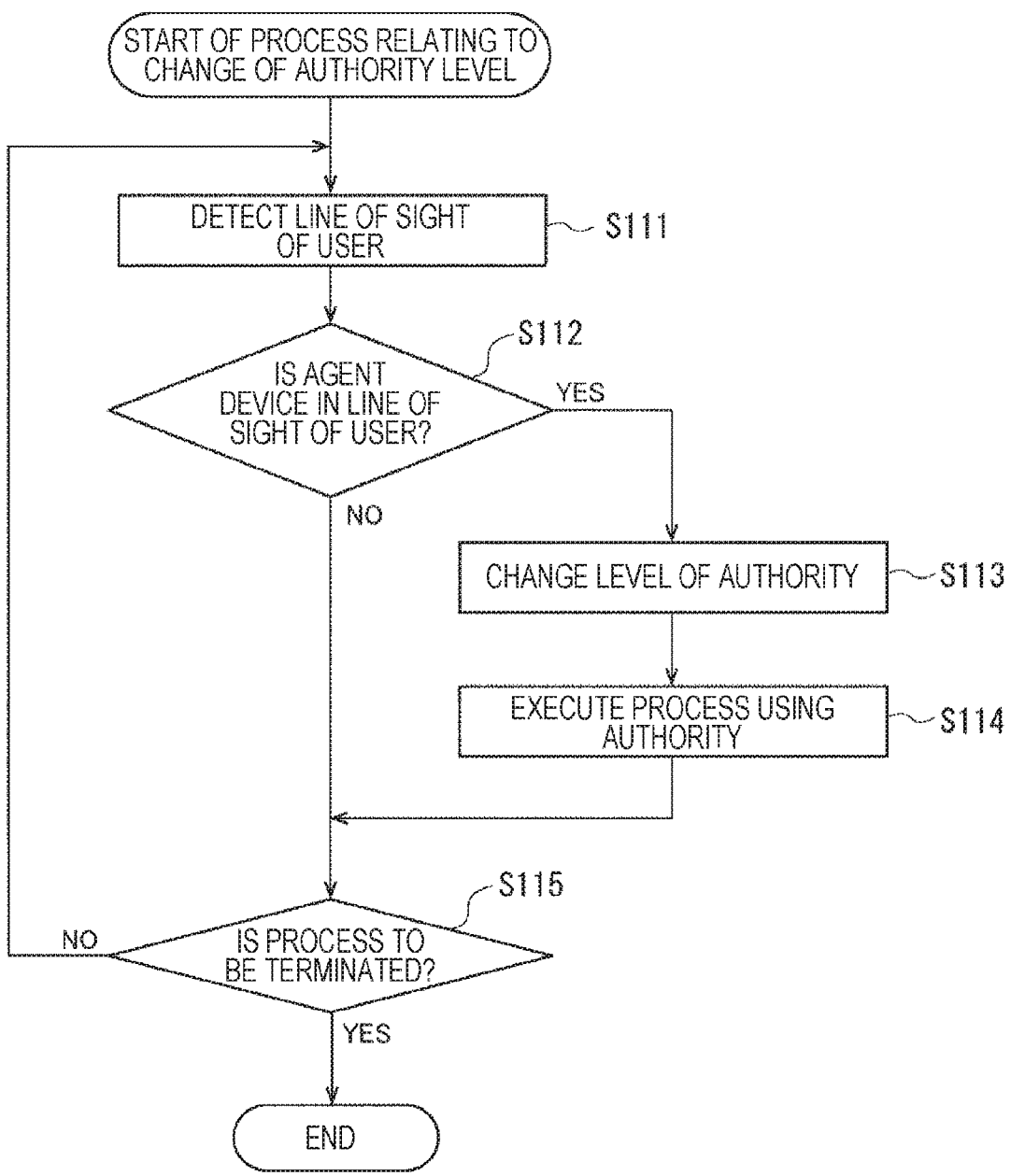

FIG. 9

| SERVICE (APPLICATION) | DEFAULT AUTHORITY | EXPANDED AUTHORITY AFTER CHANGE |
|---|---|---|
| CALENDAR | BROWSING OF CALENDAR | CREATION OF CALENDAR |
| ONLINE SHOPPING | BROWSING OF PAST SHOPPING HISTORY | PURCHASE OF PRODUCT |
| HOME ALLIANCE | WATER TEMPERATURE REGULATION UP TO 35 DEGREES | WATER TEMPERATURE REGULATION TO 35 DEGREES OR MORE |
| FACTORY | USE OF TOOL | STOP OF LINE |
| PASTORALISM | FEEDING OF LIVESTOCK | KILLING OF LIVESTOCK |
| AGRICULTURE | WATERING OF CROP AND LIKE | HARVEST OF CROP |
| SNS | BROWSING OF PROFILE OF INDIVIDUAL | BROWSING OF FAMILY PROFILE |
| SNS | READING OF ANOTHER PERSON'S Tweet | CREATION OF Tweet |
| FILE SERVER | BROWSING | DELETION, CREATION |
| BANK | CHECK OF BALANCE | TRANSFER |
| INVESTMENT | UP TO ONE MILLION | UP TO TEN MILLION |
| MEDICAL CARE | MEASUREMENT OF BODY TEMPERATURE, PULSE | ADMINISTRATION OF MEDICINE |

** METHOD AND SYSTEM OF PASSING AND APPLYING DELEGATIONS OF AUTHORITY

CROSS REFERENCE TO RELATED APPLICATIONS

This application is a U.S. National Phase of International Patent Application No. PCT/JP2018/006114 filed on Feb. 21, 2018, which claims priority benefit of Japanese Patent Application No. JP 2017-042682 filed in the Japan Patent Office on Mar. 7, 2017. Each of the above-referenced applications is hereby incorporated herein by reference in its entirety.

TECHNICAL FIELD

The present technology relates to an information processing device, an information processing method, and a program and, for example, relates to an information processing device, an information processing method, and a program enabled to perform a process of giving authority to access predetermined information without bothering a user.

BACKGROUND ART

Information search and information management using the Internet have been widespread. For example, a user can receive a service such as simply reading and writing personal information including a schedule and an electronic mail, by accessing a predetermined server via a network using a user's own terminal.

User authentication is performed to ensure that only authorized users can be provided with the service. Methods of user authentication include, for example, a method of prompting a user to make an operation for authentication, such as password input, a method of detecting a device as a key of authentication by wireless communication, and a method of performing biometric authentication using biometric information.

However, when the user is prompted to make an operation for authentication, there is a possibility that the user is burdened, for example, by a load of inputting an ID and a password each time access is performed. Patent Document 1 presents a proposal for reducing such burden.

CITATION LIST

Patent Document

Patent Document 1: Japanese Patent Application Laid-Open No. 2016-194755

SUMMARY OF THE INVENTION

Problems to be Solved by the Invention

For example, it is expected that the authority to access a predetermined server and acquire predetermined information is delegated to an agent device (service) such that information desired by the user can be presented by the agent device side with the delegated authority when required by the user without bothering the user.

The present technology has been made in view of such a situation and is intended to achieve improvement of the convenience of a user.
Solutions to Problems An information processing device according to one aspect of the present technology includes an acquisition unit that acquires information for receiving delegation of an authority that is predetermined, a change unit that changes a level of the authority when a predetermined condition is satisfied, and a processing unit that performs a process using the authority that is predetermined.

An information processing method according to one aspect of the present technology includes steps of acquiring information for receiving delegation of an authority that is predetermined, changing a level of the authority when a predetermined condition is satisfied, and performing a process using the authority that is predetermined.

A program according to one aspect of the present technology causes a computer to execute a process including steps of acquiring information for receiving delegation of an authority that is predetermined, changing a level of the authority when a predetermined condition is satisfied, and performing a process using the authority that is predetermined.

In the information processing device, the information processing method, and the program according to one aspect of the present technology, information for receiving delegation of an authority that is predetermined is acquired, a level of the authority is changed when a predetermined condition is satisfied, and a process is performed using the authority that is predetermined.

Note that the information processing device may be an independent device or an internal block constituting one device.

Furthermore, the program can be provided by being transferred via a transfer medium or by being recorded on a recording medium.
Effects of the Invention According to one aspect of the present technology, the convenience of a user can be improved.

Note that the effects described herein are not necessarily limited and any effects described in the present disclosure may be applied.

BRIEF DESCRIPTION OF DRAWINGS

FIG. 8 is a flowchart for explaining a process relating to the change of an authority level.

FIG. 9 is a diagram for explaining the change of authority levels.

MODE FOR CARRYING OUT THE INVENTION

Modes for carrying out the present technology (hereinafter, referred to as embodiments) will be described below.
<Configuration Example of System>

Figure 1:
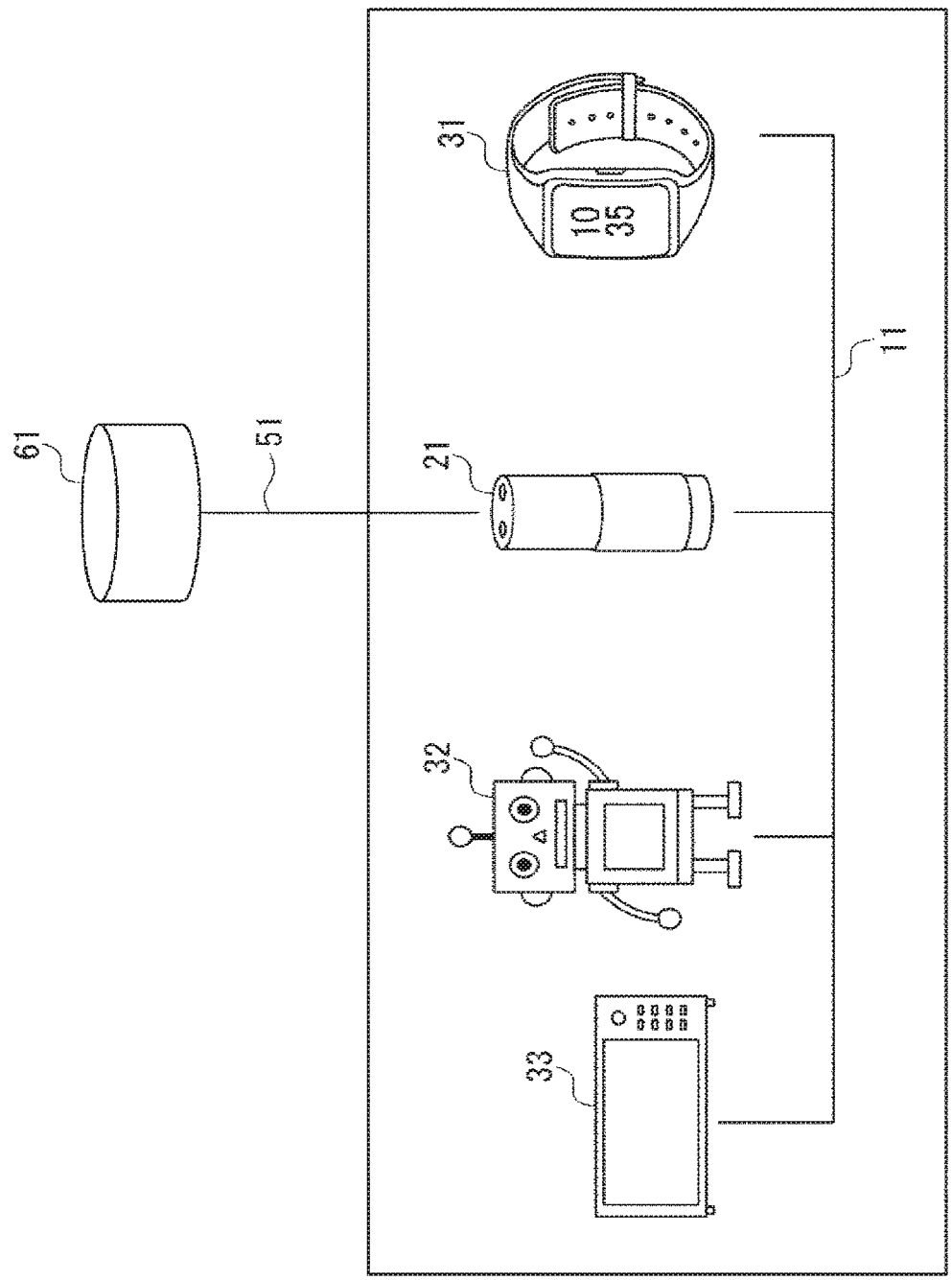
FIG. 1 is a diagram illustrating the configuration of an embodiment of a system to which the present technology is applied.

FIG. 1 is a diagram illustrating the configuration of an embodiment of an information processing system to which the present technology is applied. In the information processing system illustrated in FIG. 1, an agent device 21 is connected to a local network 11. Furthermore, a wearable device 31, a robot 32, and a cooking home appliance 33 are also connected to the local network 11.

The local network 11 is assumed as, for example, a network constructed in a predetermined building such as a home or a shop, or in a vehicle such as a car or a train. Furthermore, the local network 11 is, for example, a local area network (LAN) or a wide area network (WAN) configured by wireless or/and wired techniques, and is configured such that data can be exchanged between connected devices.

Note that a configuration in which the wearable device 31, the robot 32, and the cooking home appliance 33 are connected to different LANs and these LANs are connected to a WAN may be adopted. In other words, the present technology can also be applied to a system configured from devices connected to different networks.

The agent device 21 has functions of controlling a device connected to the local network 11, accessing an external server 61 via the Internet 51 to search for information, and presenting information obtained by the search to a user.

The wearable device 31 is, for example, a watch-type device, a spectacles-type device, a clothes-type, a shoe-type, or a hat-type device, or an accessory-type device such as a ring type, a bracelet type, or a nail type, and is a device worn by the user. A smartphone or the like may also be employed.

The robot 32 is a robot called a pet robot or the like, or a robot for customer service situated in a shop. The robot 32 is a functional device that has an appearance simulating a person, an animal, or the like and can communicate with the user.

The cooking home appliance 33 is assumed to belong to a device called an Internet of things (IoT) device, and is connected to a network to have a function controlled by the agent device 21 in addition to its original function.

<Movement Example of System>

The movement of the system illustrated in FIG. 1 will be described with reference to FIG. 2.

At time T1, the user wearing the wearable device 31 enters or leaves, for example, a predetermined room.

When the wearable device 31 is put into a state ready to communicate with the agent device 21, the wearable device 31 transmits a serial ID and inquiry server information to the agent device 21. This transmission may be performed via the local network 11 or may be performed by communication such as Bluetooth (registered trademark).

The wearable device 31 is pre-registered to the server 61 at a time point (time T0) prior to providing the agent device 21 with the serial ID and the inquiry server information. In the pre-registration, information such as the serial ID, a user feature point, service information, a user ID, and a one-time password is provided to the server 61 and is registered in the server 61.

The "server information" supplied from the wearable device 31 to the agent device 21 at time T1 is information regarding the server 61 to which the aforementioned information has been pre-registered and, for example, is a uniform resource locator (URL). Furthermore, the serial ID is an ID for identifying the wearable device 31.

At time T2, the agent device 21 accesses the server 61 using the server information supplied from the wearable device 31 and makes an inquiry with the serial ID supplied from the wearable device 31. As a result of the inquiry, at time T3, information registered at the pre-registration, such as the user feature point, the service information, the user ID, and the one-time password, is supplied from the server 61 to the agent device 21.

The user feature point registered to the server 61 at the pre-registration is information for specifying the user and, for example, is a feature point extracted from a face image obtained by photographing the user, a feature point extracted from the user's voice, or biological information such as a fingerprint of the user. The service information registered to the server 61 at the pre-registration is information regarding services provided to the user, such as a schedule and an e-mail.

Furthermore, the user ID and the one-time password registered to the server 61 at the pre-registration are information used when determining whether or not the user is a legitimate user, when a service such as the schedule is accessed.

The agent device 21 can access the service provided to the user by the server 61 by acquiring such information. In other words, the agent device 21 obtains the authority to access the service.

The agent device 21 is designed so as not to utilize the authority to access the service when the user is not present, even after obtaining the authority to access the service. For example, the agent device 21 images the user and specifies the user using the captured image and the user feature point supplied from the server 61. Furthermore, the specified user and the user ID are linked and managed.

While the specified user can be monitored, the agent device 21 is placed in a state ready to access the server 61 and utilize the service using the linked user ID. On the other hand, when the specified user cannot be monitored, the agent device 21 is placed in a state not ready to access the server 61 or utilize the service using the linked user ID.

<Configuration Example of Agent Device>

Figure 3:
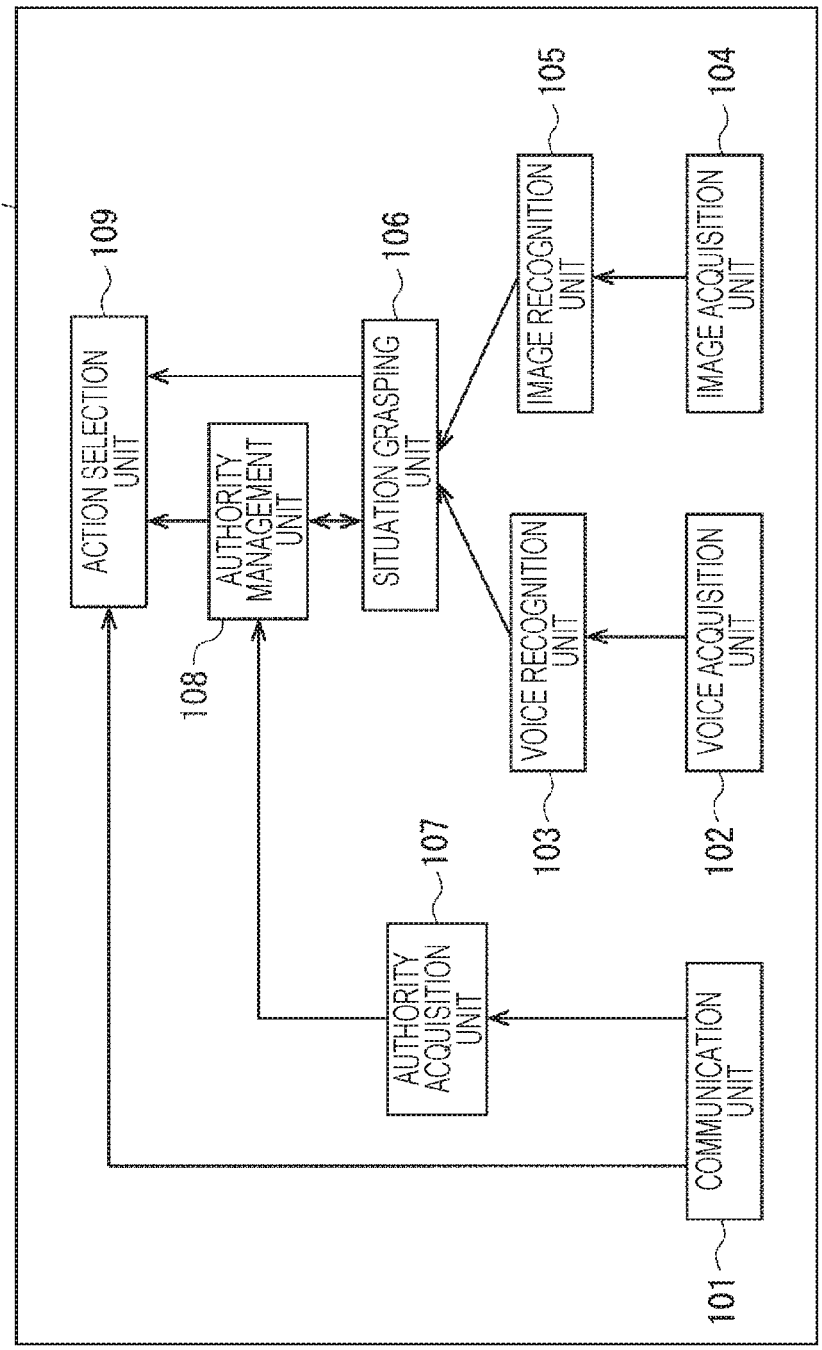
FIG. 3 is a diagram for explaining a configuration example of an agent device.

The configuration of the agent device 21 that manages the authority in this manner will be described. FIG. 3 is a diagram illustrating a configuration example of the agent device 21.

The agent device 21 has a configuration including a communication unit 101, a voice acquisition unit 102, a voice recognition unit 103, an image acquisition unit 104, an image recognition unit 105, a situation grasping unit 106, an authority acquisition unit 107, an authority management unit 108, and an action selection unit 109.

The communication unit 101 communicates with other devices via the local network 11 and also communicates with the server 61 via the Internet 51. The voice acquisition unit 102 acquires the voice of the user. The acquired voice is supplied to the voice recognition unit 103. The voice recognition unit 103 analyzes the supplied voice to specify the user and also analyzes the content of the instruction from the user by voice.

The image acquisition unit 104 acquires an image of the user. The acquired image is supplied to the image recognition unit 105. The image recognition unit 105 analyzes the supplied image to specify the user.

The situation grasping unit 106 accepts each of the recognition result from the voice recognition unit 103 and the recognition result from the image recognition unit 105 and grasps the situation of the user, for example, a situation of being located near the agent device 21.

The authority acquisition unit 107 acquires information such as the user ID and the one-time password acquired from the server 61 via the communication unit 101, in different terms, the authority (information regarding the authority) to access predetermined information, and supplies the acquired authority to the authority management unit 108.

The authority management unit 108 manages the authority acquired by the authority acquisition unit 107. For example, using user grasping information by the situation grasping unit 106, the authority management unit 108 determines that the user is in a state ready to utilize the authority because the user is present close to the agent device 21, or determines to discard the authority because the user has gone away from the agent device 21.

The action selection unit 109 selects the action of the agent device 21, for example, an action of accessing the server 61 to receive provision of a service, or selects an action of controlling another device. In other words, the action selection unit 109 performs a process using the authority. The action selection unit 109 accesses the server 61 or accesses another device via the communication unit 101 as necessary as a result of the selection.

<About Process of Agent Device>

Figure 4:
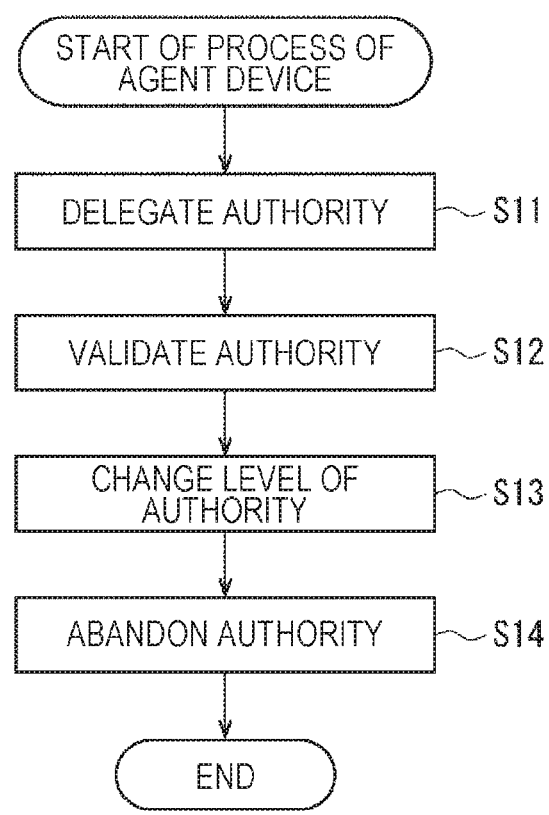
FIG. 4 is a flowchart for explaining an outline of a process of the agent device.

The process of the agent device 21 having such a configuration will be described. FIG. 4 is a flowchart for explaining an outline of the process of the agent device 21. Details of each process will be described later.

In step S11, the authority is delegated. As described with reference to FIG. 2, the agent device 21 obtains the authority to receive provision of a predetermined service, by the processes executed at time T1 to time T3. The process regarding the delegation of the authority will be described later with reference to FIG. 5.

In step S12, the authority is validated. For example, the authority is validated when the user and the agent device 21 are in some communication and the authority is utilized during a period in which the authority is validated. The process relating to the validation of the authority will be described later with reference to FIGS. 6 and 7.

In step S13, the authority level is changed. For example, a level is prepared for the authority and is configured such that more detailed information is allowed to be accessed or the information is allowed to be changed with a higher level. Furthermore, the level is changed under a predetermined condition or a predetermined situation. The process relating to the change of the authority level will be described later with reference to FIGS. 8 and 10.

In step S14, the authority is abandoned. The acquired authority is discarded, for example, when a predetermined time has passed since the user was determined not to be present, or a preset condition for discarding the authority is satisfied.

<About Process Relating to Delegation of Authority>

Figure 5:
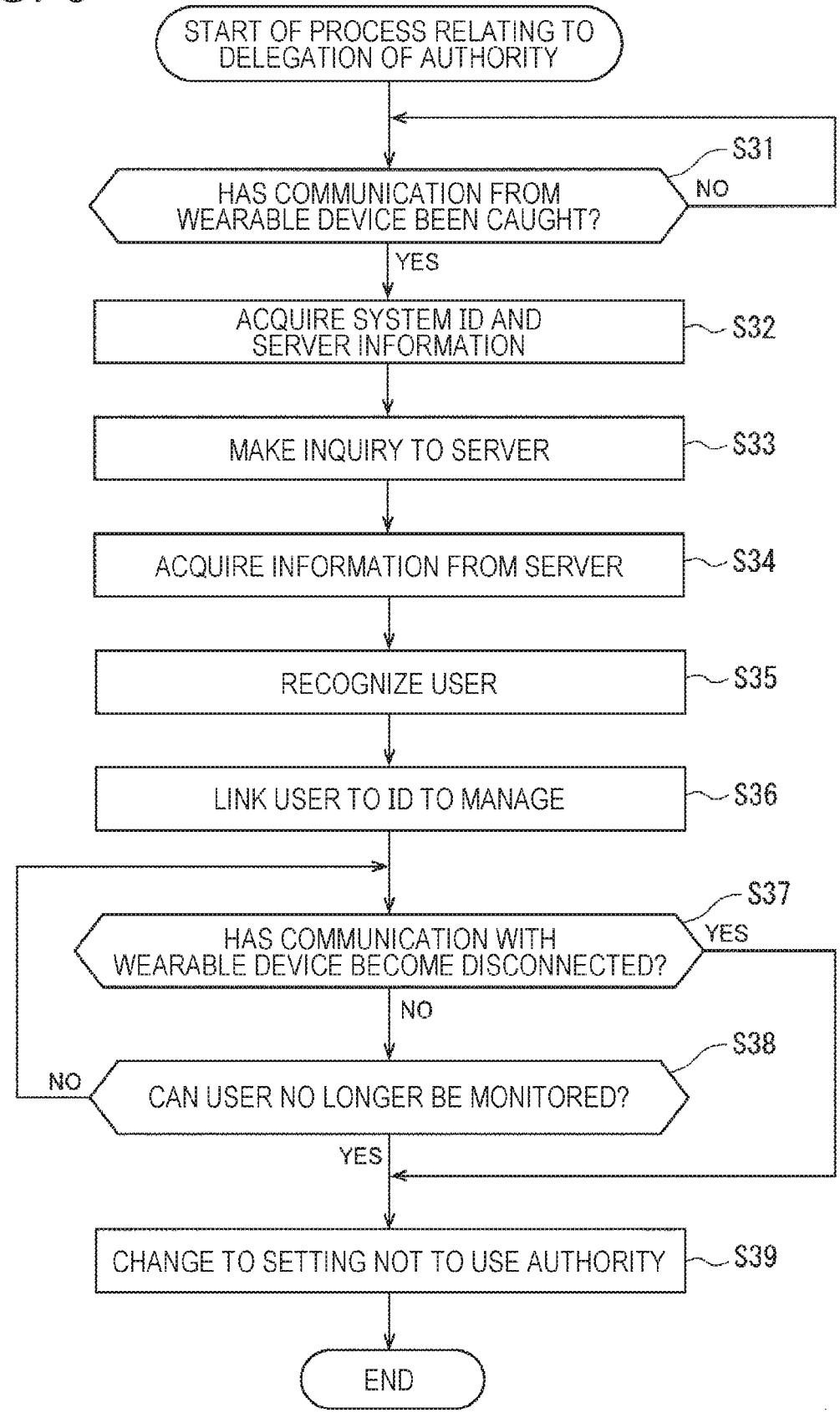
FIG. 5 is a flowchart for explaining a process relating to delegation of authority.

Details of the process relating to the delegation of the authority executed in step S11, which is a process performed by the agent device 21, will be described with reference to a flowchart illustrated in FIG. 5.

In step S31, the agent device 21 determines whether or not the communication from the wearable device 31 has been caught. For example, the authority acquisition unit 107 (FIG. 3) determines whether or not the communication unit 101 has caught Bluetooth (registered trademark) beacon communication from the wearable device 31. In step S31, the standby information is maintained until it is determined that the communication from the wearable device 31 has been caught and, in a case where it is determined that the communication from the wearable device 31 has been caught, the process proceeds to step S32.

In step S32, the authority acquisition unit 107 of the agent device 21 acquires a system ID and server information from the wearable device 31. The system ID and the server information may be transmitted and received, for example, by Bluetooth (registered trademark) beacon communication from the wearable device 31, or may be transmitted and received by communication via the local network 11.

In step S33, in a case where the system ID is acquired by the authority acquisition unit 107, the authority management unit 108 of the agent device 21 instructs the action selection unit 109 to access the server 61 on the basis of the acquired server information and execute an inquiry with the system ID.

In step S34, as a result of the inquiry in step S33, information from the server 61 is acquired. The user feature point, the service information, the user ID, and the one-time password are supplied from the server 61 to the authority acquisition unit 107 via the communication unit 101.

Note that the explanation is continued here assuming that the user feature point, the service information, the user ID, and the one-time password are acquired; however, a case where at least one of these pieces of information is acquired and a case where information other than these pieces of information is additionally acquired also fall within the application scope of the present technology. Furthermore, although the explanation is continued assuming that the one-time password is acquired, a password may be acquired.

In step S35, the user is recognized. In a case where the user is recognized using an image, the image acquisition unit 104 captures an image of the user. The image recognition unit 105 analyzes the image acquired by the image acquisition unit 104 and extracts a feature point of the user. The situation grasping unit 106 specifies the user using the user feature point supplied from the image recognition unit 105 and the user feature point supplied via the authority management unit 108.

For example, in a case where the degree of coincidence of the user feature points is high, the user is recognized as a user registered in the server 61, in different terms, a legitimate user and, in a case where the degree of coincidence is low, a process of locating another user from within the image and calculating the degree of coincidence with the another user is performed.

Furthermore, voice can also be used to recognize the user. The voice acquisition unit 102 acquires the voice of the user. The voice recognition unit 103 analyzes the voice acquired by the voice acquisition unit 102 and extracts a feature point of the user. The situation grasping unit 106 specifies the user using the user feature point supplied from the voice recognition unit 103 and the user feature point supplied via the authority management unit 108.

Although the image and the voice have been described as an example here, the user may be recognized using other information.

In step S36, the authority management unit 108 links the recognized user to the information (the service information, the user ID, the one-time password, and the like) acquired from the server 61 to manage.

In step S37, the state grasping unit 106 determines whether or not communication with the wearable device 31 has become disconnected. For example, this determination can be made depending on whether or not Bluetooth (registered trademark) beacon from the wearable device 31 can be received, or whether or not an inquiry executed by the agent device 21 to the wearable device 31 has been responded.

In step S38, the state grasping unit 106 determines whether or not the user can no longer be monitored. For example, as in the above-described case of specifying the user, this determination can be made depending on whether or not the user has been specified by capturing an image and analyzing the captured image, or whether or not the user has been specified by acquiring a voice and analyzing the acquired voice.

The determination in step S37 and the determination in step S38 are made to ensure that the agent device 21 performs a process using the authority only while the user (wearable device 31) is present within a range that can be monitored by the agent device 21. Therefore, in a case where it is determined in step S37 that communication with the wearable device 31 has become disconnected, or in a case where it is determined in step S38 that the user can no longer be monitored, the process proceeds to step S39 and setting is made such that the authority is not used.

In a case where setting is made such that the authority is not used, this setting is made, for example, by invalidating the one-time password or discarding the acquired authority (deleting the acquired information).

Note that whether or not the user is present within the range that can be monitored by the agent device 21 may be found using position information obtained by a global positioning system (GPS). Furthermore, for example, for a room for which entry management is performed, information on the entry management may be used. In other words, the authority may be set so as not to be used at the time point when information indicating that the room has been left is obtained.

<About Process Relating to Validation of Authority>

A process for when the authority is delegated to the agent device 21 as described above and then this delegated authority is validated will be described. The authority is validated when it is determined that the user and the agent device 21 are in some communication. Some communication includes facing the agent device 21, making some operation on the agent device 21, and having a conversation with the agent device 21.

Figure 6:
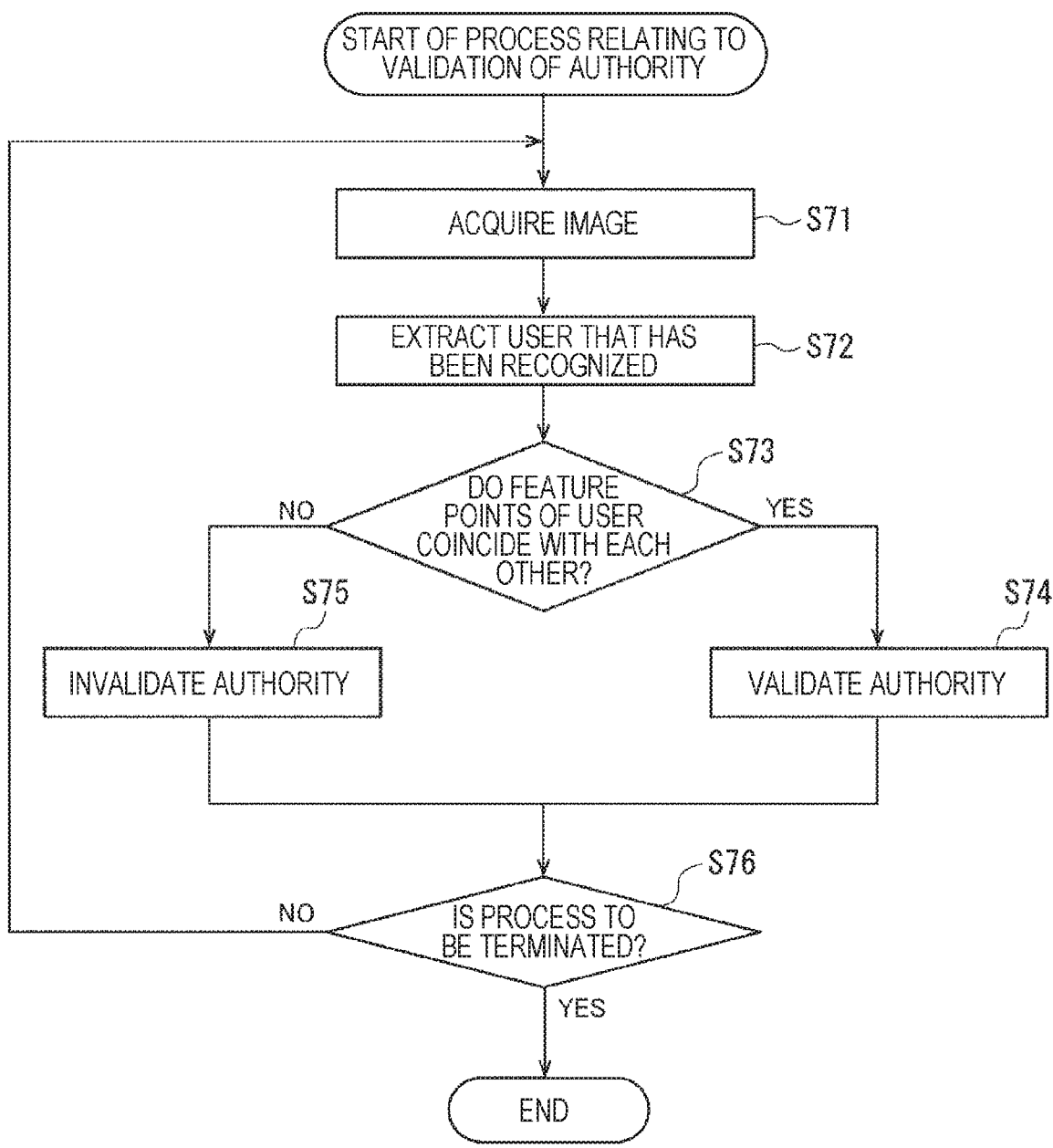
FIG. 6 is a flowchart for explaining a process relating to the validation of authority.

First, the case of executing a process relating to the validation of authority using an image will be described with reference to a flowchart in FIG. 6. In step S71, the agent device 21 acquires an image, for example, by capturing an image. In step S72, a user that has been recognized is extracted from the acquired image.

In step S73, it is determined whether or not the feature point of the extracted user coincides with the feature point of the user acquired from the server 61. In a case where it is determined in step S73 that the feature points of the user coincide with each other, the authority is validated in step S74. On the other hand, in a case where it is determined in step S73 that the feature points of the user do not coincide with each other, the authority is invalidated in step S75.

Generally, the feature point of the user is often extracted from the face portion. In a case where the user is imaged in the image captured by the agent device 21, the feature point is extracted from this user, and the extracted feature point coincides with the feature point registered in the server 61, it is highly likely that the user is facing the agent device 21. Therefore, when the user is facing the agent device 21 in such a manner, the authority is validated.

In a case where the authority is validated in step S74, or in a case where the authority is invalidated in step S75, the process proceeds to step S76. In step S76, it is determined whether or not the process is to be terminated. In a case where it is determined in step S76 that the process is not to be terminated, the process returns to step S71 and the subsequent processes are repeated. On the other hand, in a case where it is determined in step S76 that the process is to be terminated, the process relating to the validation of authority is terminated.

In this manner, the image is used to validate the authority. Next, a process for when the authority is validated by voice will be described with reference to a flowchart in FIG. 7.

In step S91, the agent device 21 acquires a voice, for example, by collecting a voice with a microphone. In step S92, a feature point in the voice of the user is extracted from the acquired voice.

In step S93, it is determined whether or not the extracted feature point of the user coincides with the feature point of the user acquired from the server 61. In a case where it is determined in step S93 that the feature points of the user coincide with each other, the authority is validated in step S94. On the other hand, in a case where it is determined in step S93 that the feature points of the user do not coincide with each other, the authority is invalidated in step S95.

In a case where the authority is validated in step S94, or in a case where the authority is invalidated in step S95, the process proceeds to step S96. In step S96, it is determined whether or not the process is to be terminated. In a case where it is determined in step S96 that the process is not to be terminated, the process returns to step S91 and the subsequent processes are repeated. On the other hand, in a case where it is determined in step S96 that the process is to be terminated, the process relating to the validation of authority is terminated.

Figure 7:
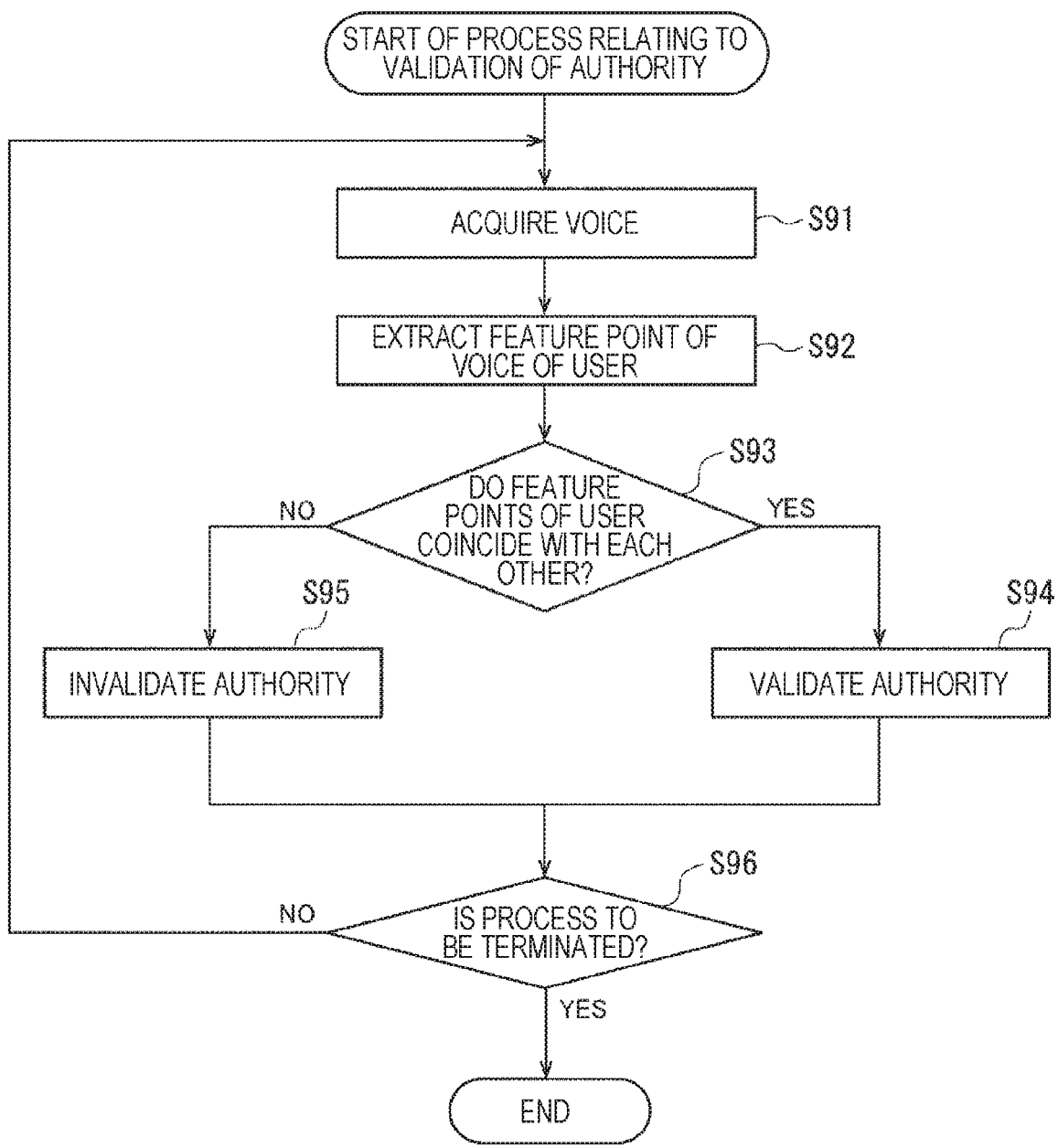
FIG. 7 is a flowchart for explaining a process relating to the validation of authority.

Only one of the process relating to the validation of authority using the image described with reference to FIG. 6 and the process relating to the validation of authority using the voice described with reference to FIG. 7 may be performed, or both of the processes may be performed in parallel.

Furthermore, in a case where both of the processes are performed in parallel, the authority may be finally validated when the authority is validated in the process based on the image, or when the authority is validated in the process based on the voice. Alternatively, the authority may be finally validated when the authority is validated in the process based on the image and the authority is validated in the process based on the voice.

As described above, the authority is validated when the agent device 21 can acquire the user's image or voice.

<About Process Relating to Change of Level of Authority>

A process for when the authority is delegated to the agent device 21 as described above and then the level of this delegated authority is changed will be described. The level of authority is changed depending on the state of the user and the agent device 21 (how the user and the agent device 21 are correlated).

First, a case where the agent device 21 executes a process relating to the change of the authority level using an image will be described with reference to a flowchart in FIG. 8.

In step S111, the line of sight of the user is detected. In step S112, the agent device 21 determines whether or not to be in the line of sight of the user, in different terms, it is determined whether or not the user is looking at the agent device 21. In a case where it is determined in step S112 that the agent device 21 is in the line of sight of the user, the process proceeds to step S113.

In step S113, the level of authority is changed. Then, a process at the changed authority level is executed in step S114. Here, an explanation about examples of the change of the authority level will be added with reference to FIG. 9.

FIG. 9 is a diagram illustrating examples of the service (application), the default authority, and the expanded authority after the change.

In the case of the authority to access the calendar as a service, the default authority is an authority to merely browse the calendar, while the expanded authority after the change is assumed as an authority to allow even the creation of the calendar. In the case of the authority regarding the online shopping as a service, the default authority is an authority to merely browse the past shopping history, while the expanded authority after the change is assumed as an authority to allow even the purchase of a product.

In the case of the authority regarding the home alliance as a service, the default authority is an authority to adjust the water temperature up to 35 degrees, while the expanded authority after the change is assumed as an authority to allow the adjustment of the water temperature to 35 degrees or more. In the case of the authority regarding authorities in a factory (the authority given to an employee working in the factory) as a service, the default authority is an authority to allow the use of a tool, while the expanded authority after the change is assumed as an authority to allow even the stop of the line.

In the case of the authority regarding pastoralism (the authority given to an employee working on a ranch) as a service, the default authority is an authority to merely permit the feeding of livestock, while the expanded authority after the change is assumed as an authority to permit even the killing of livestock. In the case of the authority regarding agriculture (the authority given to an employee working on a farm) as a service, the default authority is an authority to merely permit a work such as watering the crop, while the expanded authority after the change is assumed as an authority to permit even the harvest of the crop.

In the case of the authority to access a social networking service (SNS) as a service, the default authority is an authority to merely browse the profile of an individual, while the expanded authority after the change is assumed as an authority to allow even the browsing of the family profile. In the case of the authority to access the SNS as a service, the default authority is an authority to merely read another person's tweet, while the expanded authority after the change is assumed as an authority to allow even the creation of a tweet.

In the case of the authority to access a file server as a service, the default authority is an authority to merely browse a file, while the expanded authority after the change is assumed as an authority to allow even the deletion and creation of a file. In the case of the authority to receive services of a bank as a service, the default authority is an authority to merely check the balance, while the expanded authority after the change is assumed as an authority to allow even the transfer.

In the case of the authority to receive investment services as a service, the default authority is an authority to allow investment up to one million yen, while the expanded authority after the change is assumed as an authority to allow investment up to ten million yen. In the case of the authority regarding the medical care (the authority given to people working in a hospital) as a service, the default authority is an authority to merely measure body temperature and pulse, while the expanded authority after the change is assumed as an authority to allow even the administration of medicine.

Such changes of the level of authority can be considered as examples.

The explanation returns to the description with reference to the flowchart in FIG. 8. In step S113, the level of authority is changed. For example, the authority to only browse the calendar is changed to the authority to allow even the creation of the calendar. Once the authority is changed in such a manner, the process proceeds to step S114 and a process using the authority is executed. For example, a process such as the creation of the calendar is executed.

In a case where a process using the authority is executed in step S114, or in a case where it is determined in step S112 that the agent device 21 is not in the line of sight of the user, the process proceeds to step S115 and it is determined whether or not the process is to be terminated. In a case where it is determined in step S115 that the process is not to be terminated, the process returns to step S111 and the subsequent processes are repeated. On the other hand, in a case where it is determined in step S115 that the process is to be terminated, the process relating to the change of the authority level is terminated.

In this manner, the image is used to change the authority level. Next, a process for when the authority level is changed by voice will be described with reference to a flowchart in FIG. 10.

In step S131, user interaction is extracted. In step S132, it is determined whether or not the extracted interaction contains the decision intention of the user. The decision intention of the user is, for example, an intention to decide the purchase of a product or an intention to change equipment. Then, in step S132, it is determined whether or not a keyword representing such intention is included in the extracted interaction.

In a case where it is determined in step S132 that the decision intention of the user is contained, the process proceeds to step S133. In step S133, the level of authority is changed. Since the processes in steps S133 to S135 are similar to the processes in steps S113 to S115 of the flowchart illustrated in FIG. 8, the description thereof will be omitted.

Figure 10:
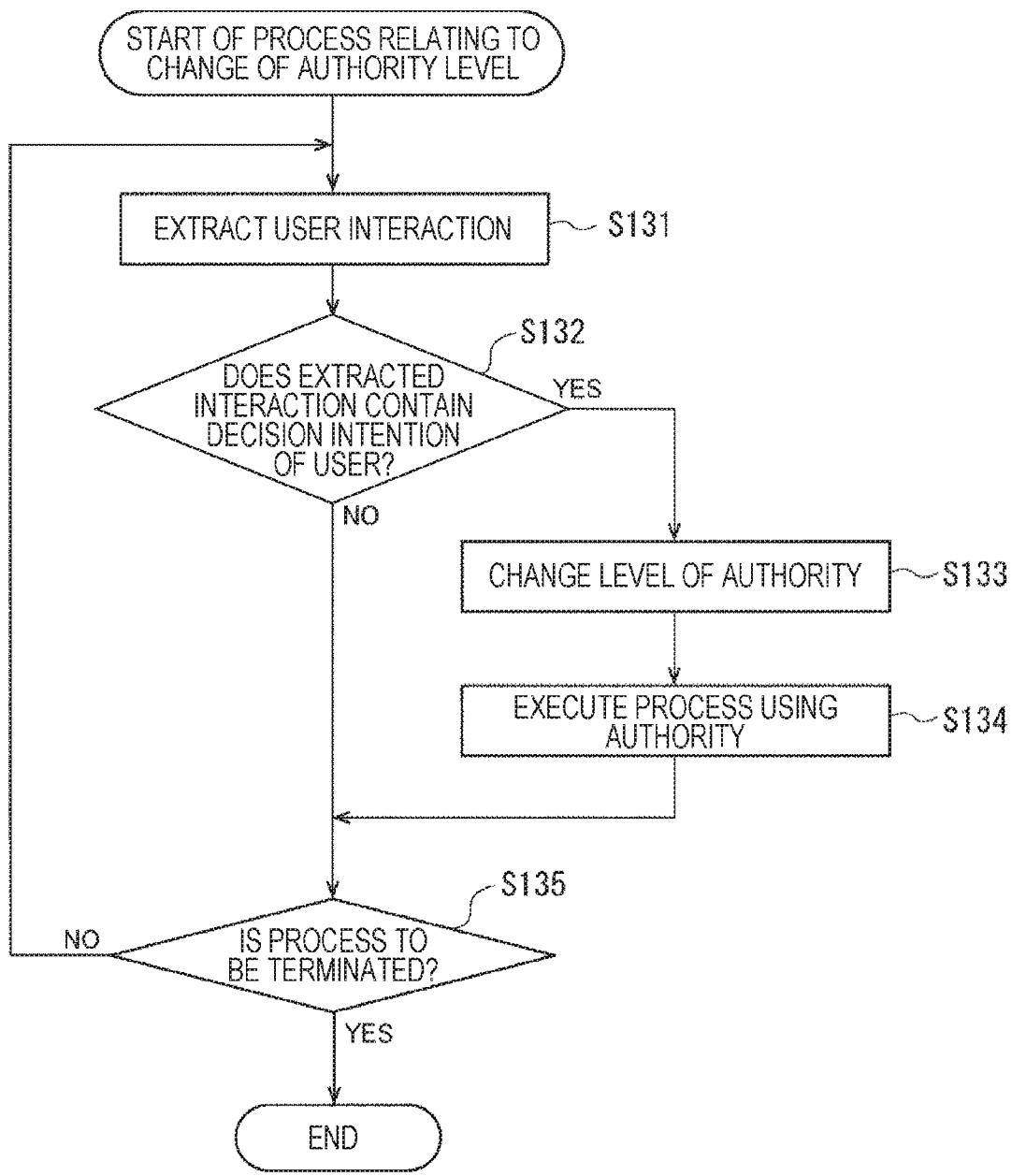
FIG. 10 is a flowchart for explaining a process relating to the change of the authority level.

Only one of the process relating to the change of the authority level using the image described with reference to FIG. 8 and the process relating to the change of the authority level using the voice described with reference to FIG. 10 may be performed, or both of the processes may be performed in parallel.

Furthermore, in a case where both of the processes are performed in parallel, the authority level may be finally changed when the authority level is changed in the process based on the image, or when the authority level is changed in the process based on the voice. Alternatively, the authority level may be finally changed when the authority level is changed in the process based on the image and the authority level is changed in the process based on the voice.

SPECIFIC EXAMPLES

The explanation of the above-described delegation, validation, level change, and the like of authority will be further continued with specific examples.

<Example of Customer Service Robot>

First, a case where the agent device 21 is a customer service robot (a case where the agent device 21 is equipped in the customer service robot) will be described as an example. When a user approaches the customer service robot (agent device 21), the wearable device 31 of the user provides the agent device 21 with the serial ID and the inquiry server information. This process is a process described as the process at time T1 with reference to FIG. 2.

Figure 2:
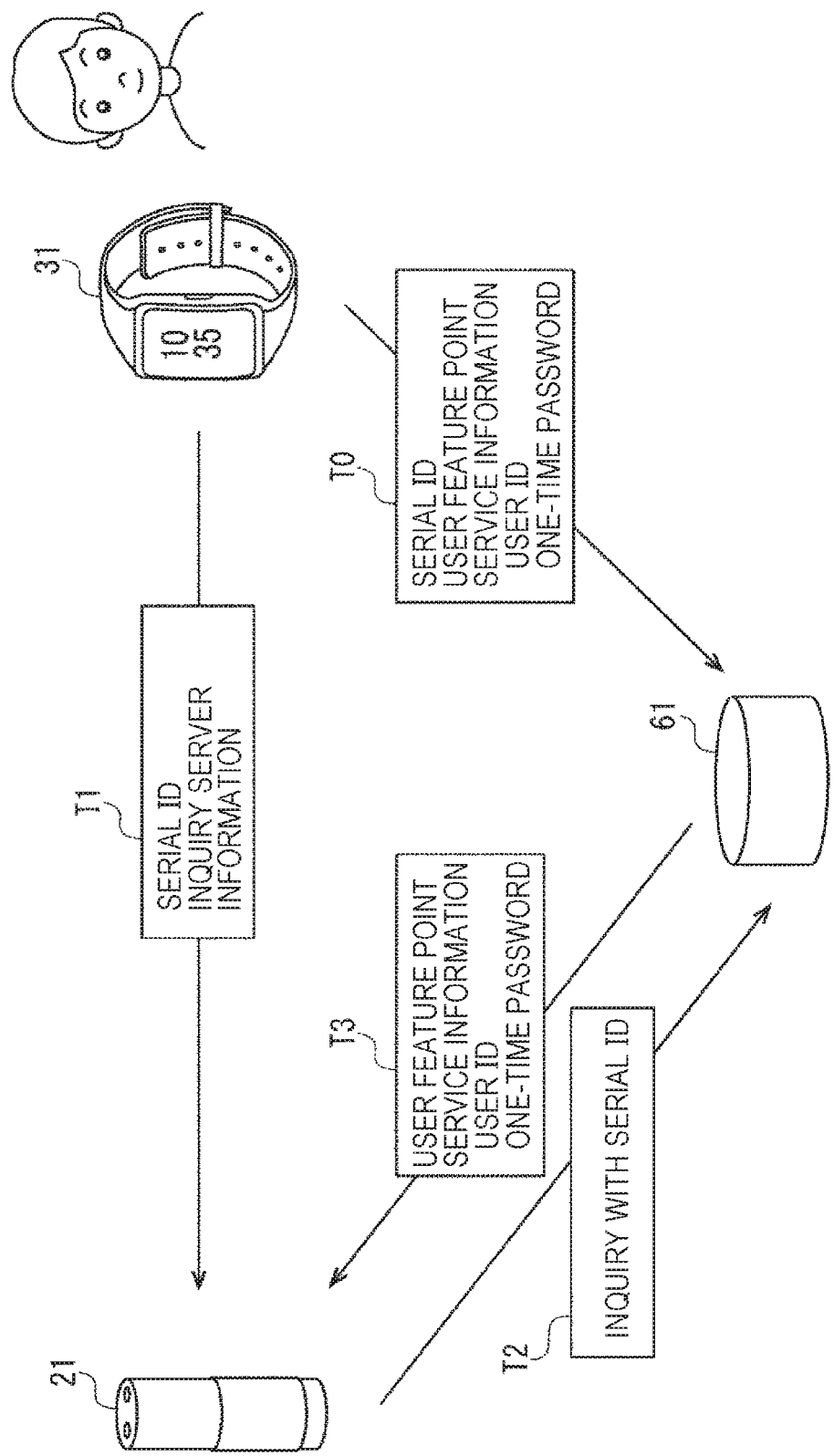
FIG. 2 is a diagram for explaining the movement of the system.

The customer service robot executes processes described as the processes at time T2 and time T3 with reference to FIG. 2 to acquire information such as the user feature point, the service information, the user ID, and the one-time password.

The customer service robot accesses information such as the user's shopping history, shop visit history, and calendar using the acquired user ID and one-time password, and seeks a product suitable for the user's preferences, plan, and the like to recommend and advises on which floor to go.

The authority to access such personal information of the individual user is taken as the default authority and such authority is delegated to the customer service robot. Then, the customer service robot performs the customer service by presenting useful information to the user using the delegated authority.

For example, in a case where the user consults the customer service robot about a present for a child, the level of authority of the customer service robot is changed. This process relating to the change of the authority level is performed on the basis of the flowchart in FIG. 10.

In other words, in step S132, it is determined that the decision intention of the user is contained in the interaction content, namely, the consultation about the present for the child among the interactions from the user, and the process proceeds to step S133.

As the process proceeds to step S133, the level of the authority delegated to the customer service robot is changed. For example, the authority is changed to an authority to allow even the browsing of the profile of the user's (shopper's) child.

Then, in step S134, once the profile of the child is browsed, information such as the preferences, age, gender, and plan of the child is acquired and a product is searched for on the basis of these acquired pieces of information. The search results are then provided to the user.

In this manner, the authority to merely browse the user's own information is temporarily changed to a wider authority to allow even the browsing of information on a person related to the user and then the service is provided.

As described above, by changing the authority level, more useful services can be provided to the user.

<Example of Home Appliance>

Next, a case where the agent device 21 controls the cooking home appliance 33 will be described as an example. Since the processes until the communication is performed between the agent device 21 and the wearable device 31, and the agent device 21 acquires information such as the user ID and the one-time password from the server 61 are performed similarly to the above-described case, the description thereof will be omitted.

A case where the cooking home appliance 33 is a gas cooker will be described as an example. The agent device 21 controls the gas cooker such that the gas cooker is allowed to be used when the user is present near the gas cooker.

Furthermore, when the user is looking at (carefully watching) the gas cooker, the authority is changed to an authority to enable cooking at higher temperature. In such a case, the user is allowed to use the gas cooker by default authority and the cooking temperature is restricted, for example, to 180 degrees or less. Moreover, for example, when the user is carefully watching the gas cooker, the authority is changed to an authority to allow cooking at a higher temperature such as 180 degrees or more.

As described above, by managing the authority and controlling the gas cooker with the agent device 21, it is possible to perform cooking more safely.

<Example in Factory>

There is a device called, for example, augmented reality (AR) glasses, which provides virtual reality. The user can see a video in which a virtual video is superimposed on the real world, by wearing spectacles-type AR glasses.

It is assumed that an employee A and an employee B working in a factory each do their tasks with the AR glasses worn. Furthermore, it is assumed that the employee A has the default authority and the employee B has the expanded authority. The default authority is assumed as an authority to permit the use of tools in the factory and the expanded authority is assumed to further have the authority to stop the line.

In such a case, for example, the AR glasses of the employee A performs a process such as masking such that tools allowed to be handled with the authority given to the employee A can be seen and tools not allowed to be handled with the given authority cannot be seen. For example, a video in a state in which a button for interrupting the line is masked so as to be invisible is provided to the employee A.

In a case where the employee B is present close to the employee A and speaks, for example, "give the authority to operate the line", the authority of the employee A is expanded.

In this case, for example, the agent device 21 monitors the conversation between the employee A and the employee B and interprets the content of the instruction from the employee B having the expanded authority to "give the authority to operate the line", thereby expanding the authority of the employee A.

Also in such a process, as described with reference to the flowchart in FIG. 10, the authority level is changed when the user interaction is analyzed and a keyword that can serve as a trigger to expand the authority is issued.

Furthermore, the AR glasses can be treated as the wearable device 31 described above, in which case, the agent device 21 separately communicates with both of the AR glasses of the employee A and the AR glasses of the employee B, and grasps each of the authority given to the AR glasses of the employee A and the authority given to the AR glasses of the employee B by executing the process in the above-described embodiment.

The agent device 21 can perform a process such as the expansion of authority within the grasped authority.

In this manner, the present technology can also be applied to a case where an authorized user gives the authority to an unauthorized user.

<Example of Car>

The agent device 21 may be equipped in a car such that the speed and the like can be restricted. Here, the explanation will be continued by taking as an example a rented car called a rental car.

When the user holds a card over the rental car, information registered in the card, such as the user ID and the one-time password, is supplied to the agent device 21.

In this case, the card functions as the wearable device 31. Furthermore, the card can be configured as a membership card for renting a rental car, a credit card for making a payment, or the like.

When the user (driver) sits in the driver's seat and looks forward, this movement is used as a trigger to expand the authority of the agent device 21. For example, the authority to allow the browsing of only the type of license before the authority is expanded is changed to an authority to allow even the browsing of the traffic violation history.

In this manner, the authority is changed such that the information on the user who is actually driving is allowed to be browsed. Furthermore, after the authority is changed to the authority to allow even the browsing of the violation history in this manner, control is performed to set the maximum speed or to permit manual driving, according to the browsed violation history.

By performing such a change of authority, safer driving can be performed.

The specific examples given here are an example and the present technology can also be applied in other ways.

As described thus far, according to the present technology, for example, the authority to access predetermined information can be acquired without bothering the user. In different terms, the user can delegate the authority to the agent device 21 without making troublesome operations.

Furthermore, the delegated authority can be changed in accordance with the situation of the user. Such a change regarding the authority can also be made without bothering the user.

Therefore, the service utilizing the authority can be provided to the user. Furthermore, it is possible to provide a service more suitable for the user according to the situation of the user.

<About Recording Medium>

A series of the above-described processes can be executed by hardware as well and also can be executed by software. In a case where the series of the processes is executed by software, a program constituting the software is installed in a computer. Herein, the computer includes a computer built into dedicated hardware and a computer capable of executing various types of functions when installed with various types of programs, for example, a general-purpose personal computer.

Figure 11:
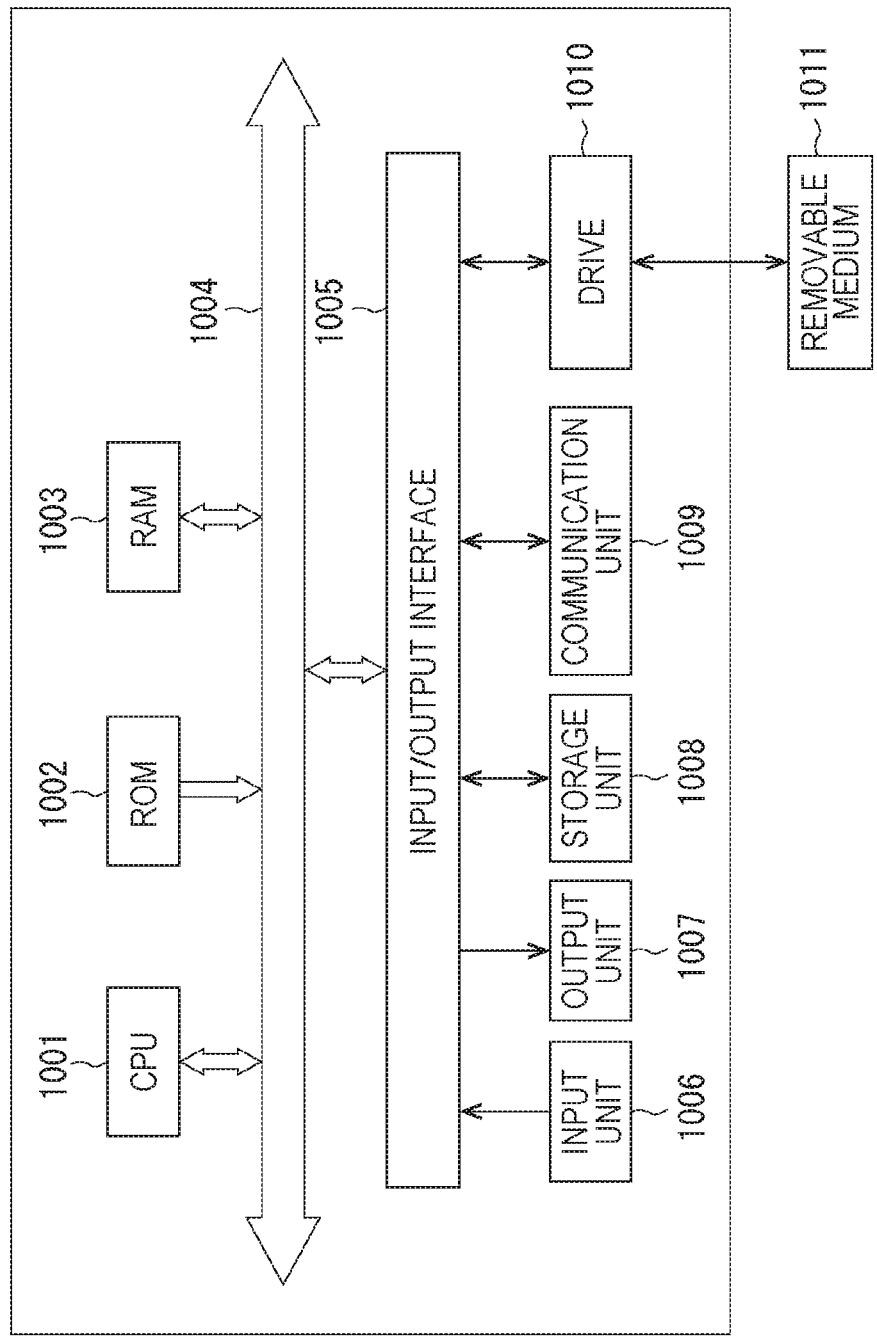
FIG. 11 is a diagram for explaining a recording medium.

FIG. 11 is a block diagram illustrating a hardware configuration example of a computer that executes the above-described series of the processes using a program. In the computer, a central processing unit (CPU) 1001, a read only memory (ROM) 1002, and a random access memory (RAM) 1003 are interconnected through a bus 1004. Moreover, an input/output interface 1005 is connected to the bus 1004. An input unit 1006, an output unit 1007, a storage unit 1008, a communication unit 1009, and a drive 1010 are connected to the input/output interface 1005.

The input unit 1006 includes a keyboard, a mouse, a microphone and the like. The output unit 1007 includes a display, a speaker and the like. The storage unit 1008 includes a hard disk, a non-volatile memory and the like. The communication unit 1009 includes a network interface and the like. The drive 1010 drives a removable medium 1011 such as a magnetic disk, an optical disc, a magneto-optical disk, or a semiconductor memory.

In the computer having the configuration as described above, for example, the aforementioned series of the processes is performed in such a manner that the CPU 1001 loads a program stored in the storage unit 1008 to the RAM 1003 via the input/output interface 1005 and the bus 1004 to execute.

For example, the program executed by the computer (CPU 1001) can be provided by being recorded in the removable medium 1011 serving as a package medium or the like. Furthermore, the program can be provided via a wired or wireless transfer medium such as a local area network, the Internet, or digital satellite broadcasting.

In the computer, the program can be installed to the storage unit 1008 via the input/output interface 1005 by mounting the removable medium 1011 in the drive 1010. Furthermore, the program can be installed to the storage unit 1008 via a wired or wireless transfer medium when received by the communication unit 1009. As an alternative manner, the program can be installed to the ROM 1002 or the storage unit 1008 in advance.

Note that, the program executed by the computer may be a program in which the processes are performed along the time series in accordance with the order described in the present description, or alternatively, may be a program in which the processes are performed in parallel or at a necessary timing, for example, when called.

Furthermore, in the present description, the term "system" refers to the entire device constituted by a plurality of devices.

Note that the effects described in the present description merely serve as examples and not construed to be limited. There may be another effect as well.

In addition, the embodiments according to the present technology are not limited to the aforementioned embodiments and a variety of modifications can be made without departing from the scope of the present technology.

Note that the present technology can be also configured as described below.

(1) An information processing device including:
an acquisition unit that acquires information for receiving delegation of an authority that is predetermined;
a change unit that changes a level of the authority when a predetermined condition is satisfied; and
a processing unit that performs a process using the authority that is predetermined.

(2) The information processing device according to (1) above, in which
the acquisition unit acquires first information,
an inquiry is made to a server using the first information to acquire second information from the server, and
the authority that is predetermined is delegated by acquiring the second information.

(3) The information processing device according to (2) above, in which
the first information is supplied from a wearable device.

(4) The information processing device according to (2) above, in which
the second information includes at least one piece of information out of a user feature point, service information, a user ID, or a password.

(5) The information processing device according to any one of (1) to (4) above, in which
the authority is validated when communication is made with a user.

(6) The information processing device according to any one of (1) to (5) above, in which
the authority is validated when the user is imaged in a captured image.

(7) The information processing device according to any one of (1) to (6) above, in which
the authority is validated when a collected voice contains a voice of the user.

(8) The information processing device according to any one of (1) to (7) above, in which
the predetermined condition is a case where a predetermined keyword is issued.

(9) The information processing device according to any one of (1) to (8) above, in which
the predetermined condition is a case where the user is carefully watching.

(10) An information processing method including steps of:
acquiring information for receiving delegation of an authority that is predetermined;

changing a level of the authority when a predetermined condition is satisfied; and performing a process using the authority that is predetermined.

(11) A program for causing a computer to execute a process including steps of:

acquiring information for receiving delegation of an authority that is predetermined;

changing a level of the authority when a predetermined condition is satisfied; and performing a process using the authority that is predetermined.

REFERENCE SIGNS LIST

11 Local network
21 Agent device
31 Wearable device
32 Robot
33 Cooking home appliance
51 Internet
61 Server
101 Communication unit
102 Voice acquisition unit
103 Voice recognition unit
104 Image acquisition unit
105 Image recognition unit
106 Situation grasping unit
107 Authority acquisition unit
108 Authority management unit
109 Action selection unit

The invention claimed is:

1. An information processing device, comprising:
a central processing unit (CPU) configured to:
acquire first information;
control transmission of an inquiry to a server based on the first information;
receive second information from the server for delegation of an authority to the information processing device, wherein
the second information is received based on the inquiry to the server;
recognize a first user and a second user based on the received second information;
validate each of the first user and the second user after the delegation of the authority;
extract, after the validation of each of the first user and the second user, interaction information based on an interaction between the first user and the second user;
change, after the validation of each of the first user and the second user, a level of the authority of the second user based on a specific keyword by the first user, wherein the extracted interaction information includes the specific keyword; and
execute a process based on the change in the level of the authority.

2. The information processing device according to claim 1, wherein the CPU is further configured to acquire the first information from a first wearable device associated with the first user and a second wearable device associated with the second user.

3. The information processing device according to claim 1, wherein the second information includes at least one of a user feature point of each of the first user and the second user, service information associated with each of the first user and the second user, a user ID of each of the first user and the second user, or a password associated with each of the first user and the second user.

4. The information processing device according to claim 1, wherein the CPU is further configured to validate the authority based on a communication with each of the first user and the second user.

5. The information processing device according to claim 1, wherein the CPU is further configured to validate the authority based on a captured image of each of the first user and the second user.

6. The information processing device according to claim 1, wherein the CPU is further configured to validate the authority based on a collected voice of each of the first user and the second user.

7. An information processing method, comprising:
acquiring first information;
controlling transmission of an inquiry to a server based on the first information;
receiving second information from the server for delegation of an authority to an information processing device, wherein
the second information is received based on the inquiry to the server;
recognizing a first user and a second user based on the received second information;
validating each of the first user and the second user after the delegation of the authority;
extracting, after the validation of each of the first user and the second user, interaction information based on an interaction between the first user and the second user;
changing, after the validation of each of the first user and the second user, a level of the authority of the second user based on a specific keyword by the first user, wherein the extracted interaction information includes the specific keyword; and
executing a process based on the change in the level of the authority.

8. A non-transitory computer-readable medium having stored thereon, computer-executable instructions, which when executed by a processor, cause the processor to execute operations, the operations comprising:
acquiring first information;
controlling transmission of an inquiry to a server based on the first information;
receiving second information from the server for delegation of an authority to an information processing device, wherein
the second information is received based on the inquiry to the server;
recognizing a first user and a second user based on the received second information;
validating each of the first user and the second user after the delegation of the authority;
extracting, after the validation of each of the first user and the second user, interaction information based on an interaction between the first user and the second user:
changing, after the validation of each of the first user and the second user, a level of the authority of the second user based on a specific keyword by the first user, wherein the extracted interaction information includes the specific keyword; and
executing a process based on the change in the level of the authority.

* * * * *